July 3, 1934.  E. R. GREER  1,965,374
SCRAPER
Filed May 13, 1932   3 Sheets-Sheet 1

INVENTOR
EDWARD R. GREER
BY
ATTORNEYS

Patented July 3, 1934

1,965,374

UNITED STATES PATENT OFFICE 1,965,374

SCRAPER

Edward R. Greer, Minneapolis, Minn.

Application May 13, 1932, Serial No. 611,146

11 Claims. (Cl. 37—168)

This invention relates to new and useful improvements in scrapers and particularly to such an apparatus adapted to be propelled by a suitable prime mover such, for example, as a tractor.

An object of the invention is to provide a scraper comprising a wheeled frame having a ground-engaging blade mounted at one end thereof and provided at its opposite end with a pivoted draft member, which member is provided with means for coupling it to a tractor, and means being provided upon the scraper frame for relatively swinging the draft member whereby the traveling movement of the scraper may be controlled independently of the prime mover.

A further object is to provide an apparatus of the class described comprising a wheeled frame having a ground-engaging blade mounted thereon and adapted for universal adjustment, and a draft member being pivotally connected to one end of said frame and provided with means for coupling it to a tractor, and said member being adapted for relative swinging movement with respect to the scraper frame by means of a suitable mechanism adapted to be manipulated by an operator stationed upon the scraper frame, whereby the traveling movement of the scraper may be controlled independently of the tractor so that the scraper may be guided to travel in a line offset from the line of travel of the tractor.

A further object is to provide an apparatus of the class described comprising a wheeled frame having a scraper blade mounted at one end thereof adapted for universal adjustment, and means being provided whereby the blade may be angularly adjusted with respect to the longitudinal center line of the machine to divert material to either side thereof, and means also being provided whereby the blade may be tilted forwardly or backwardly; and a draft member being pivotally connected to the opposite end of the machine frame and provided with means for coupling it to a tractor or other prime mover, and a worm and gear device being provided for controlling the swinging movement of said draft member whereby the apparatus may be guided independently of the tractor, and an operator's station being situated upon said frame from which the controls for relatively adjusting the blade and relatively swinging the draft member may be manipulated by an operator stationed thereon.

Other objects of the invention reside in the novel construction of the blade supporting means whereby the ends of the blades are adapted for independent vertical adjustment, and also whereby the blade may be tilted or adjusted to various different angular positions; in the novel arrangement of the draft member provided at one end of the machine frame, and the means provided for actuating said member; and, in the simple and inexpensive construction of the apparatus as a whole, and whereby it may be used as a scraper or a bulldozer.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 5 is a view showing the novel scraper attached to the forward end of a tractor and the draft member adjusted to an angular position to cause the scraper to travel on a line offset from the line of travel of the tractor.

Figure 1:
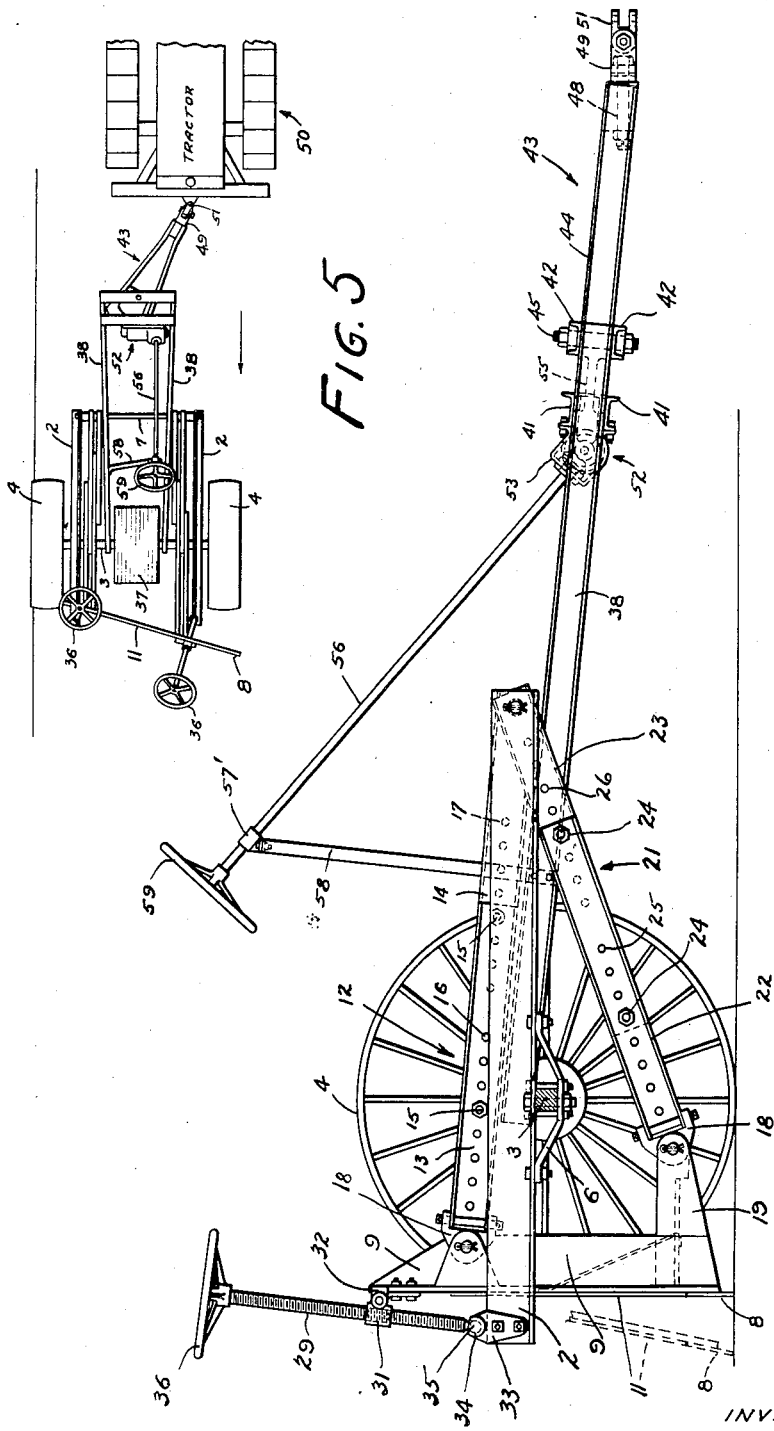
Figure 1 is a longitudinal sectional view on the line 1—1 of Figure 2, showing the means provided for tilting the blade forwardly and backwardly, and also the means for vertically adjusting the blade.

The novel scraper featured in this invention is shown comprising a frame composed of side rails 2 secured to an axle 3 provided with suitable carrying wheels 4. The side rails 2 are shown of angle iron cross section and are rigidly secured to the axle by suitable bolts 5 and brackets 6. The forward ends of the side rails are connected together by a suitable cross member 7 which preferably is cylindrical in cross section, as shown and has its ends received in suitable apertures provided in the rails 2.

Figure 3:
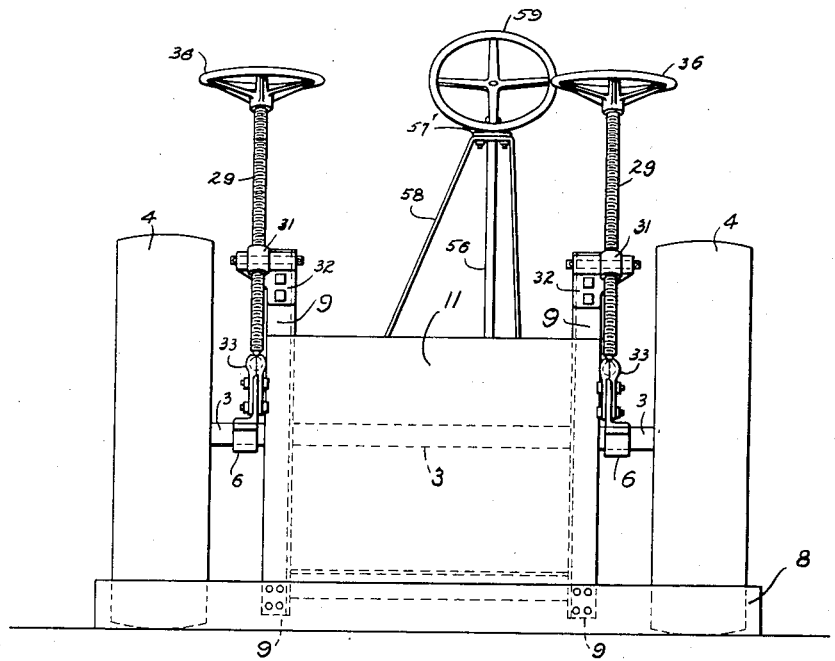
Figure 3 is a rear view of Figure 1, showing the blade in a horizontal position.
Figure 4:
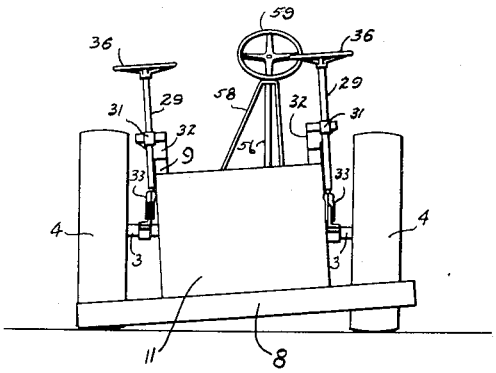
Figure 4 is a similar view on a smaller scale, showing one end of the blade elevated.

A suitable scraper blade 8 is provided at one end of the frame 2 which, in the present case, may be considered the rear end thereof. This scraper blade extends from side to side of the apparatus, as best shown in Figure 3 and is secured to the lower ends of a pair of supporting members 9, which may be of angle iron cross section. A plate 11 is also secured to the supporting members 9, as shown in Figures 3 and 4. The plate 11 may be suitably secured to the supporting members 9 by such means as welding or riveting, not shown in the drawings.

The upper end portions of the supporting members 9 are pivotally connected to a pair of draft members 12, each comprising two sections 13 and 14 secured together by suitable bolts 15, received in apertures 16 and 17, provided in the sections 13 and 14, respectively, as shown in Figure 1. The forward ends of the sections 14 are apertured to receive the cross member 7, whereby they are adapted for pivotal movement thereon. The rear end portions of the sections 13 are connected to the supporting members 9 by suitable fittings 18 which provide universal connections between the sections 13 and supporting members 9.

Figure 2:
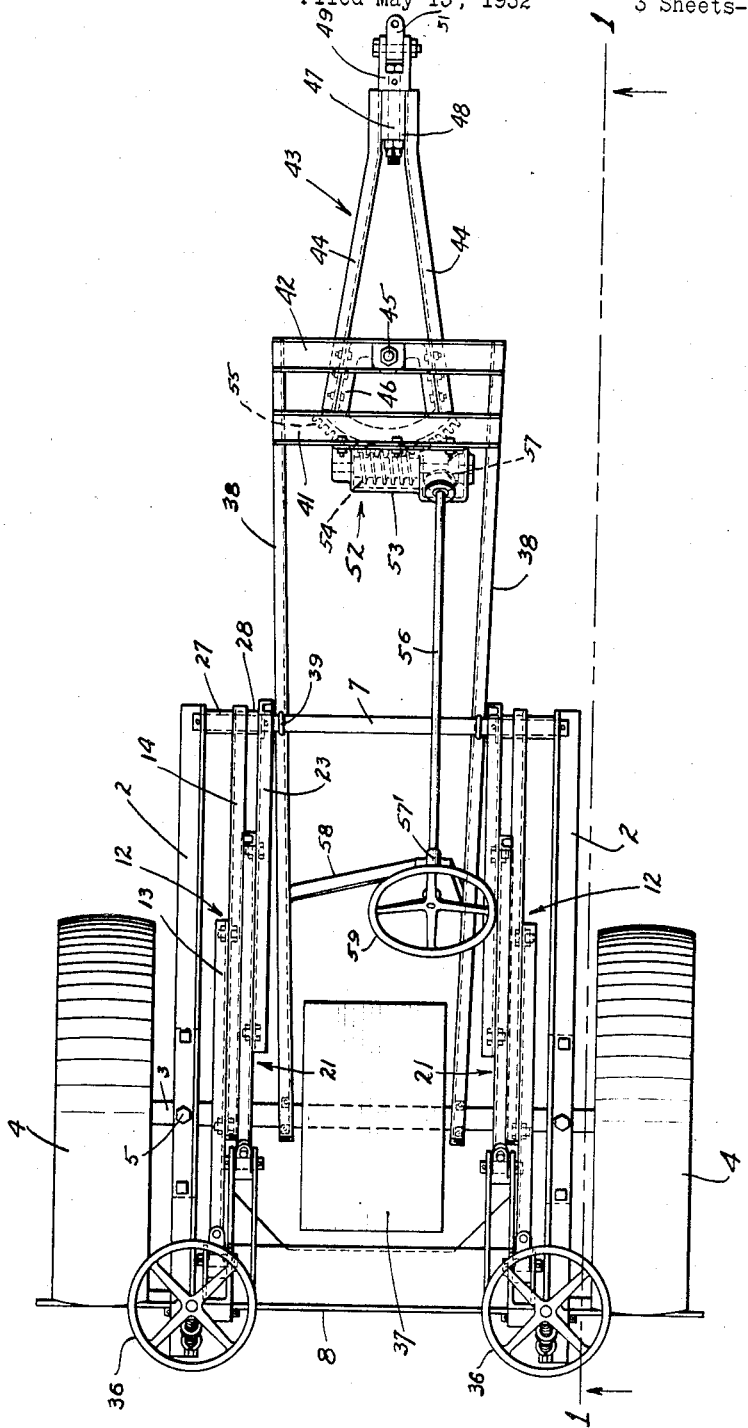
Figure 2 is a plan view of Figure 1, showing the operator's station and the controls arranged adjacent thereto, and also showing the pivoted draft member at the forward end of the apparatus.

The lower ends of the supporting members 9 are shown provided with forward extensions 19 operatively connected to a pair of similar draft members 21, each comprising sections 22 and 23 adjustably secured together by bolts 24 received in apertures 25 and 26 provided in the sections 22 and 23, respectively, as best shown in Figure 1. The forward ends of the sections 23 are pivotally connected to the cross member 7 in a manner similar to the sections 14 of the draft members 12, and the rear end portions of the sections 22 are connected to the extensions 19 by similar fittings 18, similar to those used in connection with the upper draft members 12. Suitable spacing elements 27 and 28 are provided between the forward ends of the draft sections 14 and 21 and the side rails 2 of the frame, as shown in Figure 2, to retain the parts in their proper positions. By constructing the draft members 12 and 21 as above described, they may be adjusted longitudinally to tilt the blade 8 and plate 11 forwardly and backwardly with respect to the machine frame, as indicated by the full and dotted lines in Figure 1.

Means is also provided for vertically adjusting the blade 8 and whereby the ends thereof may be adjusted independently of each other. Such means is best shown in Figures 1 and 3, and comprises a pair of threaded rods 29 received in threaded engagement with suitable bearings 31 pivotally supported upon the upper ends of the supporting members 9 by suitable brackets 32. Brackets 33 are secured to the rearwardly extending end portions of the side rails 2 and have spherical seats or sockets 34 therein adapted to receive the lower spherical end portions 35 of the threaded rods 29, whereby ball-and-socket connections are provided between the rods 29 and brackets 33. The brackets 33 are preferably split, as shown in Figure 3, to facilitate construction and assembly. Suitable hand wheels 36 are provided at the upper ends of the rods 29 whereby they may be conveniently rotated. A suitable platform 37 is shown secured to the axle 3 and functions to provide an operator's station.

Another important feature of this invention resides in the construction of the draft means provided for coupling the scraper to a tractor or other suitable prime mover. As best shown in Figure 2, the draft means comprises a pair of forwardly extending rails 38 having their rear end portions suitably secured to the axle 3 and their intermediate portions to the cross member 7 by such means as U bolts 39. The forward end portions of the rails 38 are connected together by cross members 41 and 42, shown arranged in pairs and secured to the upper and lower faces of the rails 38.

A suitable draft tongue 43 comprising suitable side elements 44, is pivotally connected to the cross member 42 by a suitable pivot pin or bolt 45 which traverses apertures provided in the cross members 42, and an aperture provided in a casting 46 which is interposed between and secured to the rear ends of the side elements 44 of the draft tongue 43 as shown in Figure 2. The casting 46 is received between the cross members 42, as shown in dotted lines in Figure 1. The forward ends of the elements 44 are suitably secured to a swivel block 47 apertured to receive a bolt 48 having a forked end portion 49 in which is mounted a suitable clevis 51 adapted to be coupled to the tractor 50, as shown in Figure 5. The bolt 48, fork 49, and clevis 51 provide a universal connection between the scraper and tractor and permit free relative movement of the scraper with respect to the tractor.

The draft tongue 43 is adapted for relative swinging movement to control the traveling movement of the scraper. To thus swing the tongue, a suitable worm-and-gear mechanism 52 is provided, which comprises a suitable housing 53 adapted to be secured to the cross members 41, and having a suitable worm 54 rotatably mounted therein, which meshes with a gear sector 55 provided upon the casting 46. The worm 54 is operatively connected to a control rod 56 by a suitable bevel gear drive indicated at 57. The rod 56 extends rearwardly from the casing 53 and is supported in a guide bearing 57' mounted upon a standard 58 suitably secured to the rails 38, as shown in Figures 1 and 2. A hand wheel 59 is secured to the rear end of the control rod 56 for rotating the same.

*Operation*

In use, this novel scraper is connected to either the forward or rearward end of a tractor, depending upon which way the scraper is to be operated. If the scraper is to be pushed ahead of the tractor, as shown in Figure 5, it is, of course, coupled to the forward end thereof, and if it is to be pulled by the tractor, it will be coupled to the rear end thereof. If the scraper is to be used for smoothening the surface of a roadway, the blade may be positioned, as shown in full lines in Figure 1, wherein it will be noted that if desired, the hand wheels 36 may be manipulated so as to cause substantially the entire weight of the machine to be carried upon the edge of the scraper blade. If the apparatus is to be used for leveling loose or soft dirt, the blade may be positioned so as not to carry any of the weight of the scraper frame. The hand wheels 36 also provide means whereby the blade may be adjusted vertically, as shown in Figure 4, for example, wherein one end of the blade is shown positioned in close proximity to the ground surface, while the opposite end thereof is spaced therefrom.

By longitudinally adjusting the draft members 12 and 21, the blade may be tilted forwardly or backwardly, as indicated by the dotted lines in Figure 1, and if it is desired to angularly adjust the blade with respect to the longitudinal center line of the scraper, the draft members 12 and 21 at one side of the machine may be elongated so as to adjust the blade to the position shown in Figure 5. The universal connections between the lower ends of the threaded rods 29 and the side rails 2 permit the blade to be adjusted to various angular positions without causing any binding in the bearings or guides for the operating parts of the apparatus.

The pivotal mounting of the draft tongue 43 at the forward end of the apparatus provides means whereby the traveling movement of the scraper may be controlled independently of the movement of the tractor. As shown in Figure 5, when the apparatus is being pushed ahead of a tractor, the operator may, by manipulation of the hand wheel 59, adjust the draft tongue 43 in such a manner as to cause the scraper to travel on a line offset from the line of travel of the tractor.

The novel scraper herein disclosed provides a very useful apparatus for leveling or moving loose dirt. It may be used as a scraper to merely scrape and level off a road surface, or the blade may be adjusted to a suitable angle, as shown in Figure 5, whereby the dirt may be diverted to one side of the roadway. The scraper may also be used as a bulldozer by pushing it ahead of the tractor.

I claim as my invention:

1. In an apparatus of the class described, a frame, means at one end of said frame for connecting it to a prime mover, a plurality of draft members connected at one end to said frame, a ground engaging blade, certain of said draft members being pivotally connected to the upper portions of said blade and others of said draft members being similarly connected to the lower portions of the blade, and means by which said draft members may be independently lengthened or shortened to relatively tilt said blade.

2. In an apparatus of the class described, a frame, means at one end of said frame for connecting it to a tractor, a plurality of draft members pivotally connected at one end to said frame and adapted for oscillatory movement, a ground engaging blade, certain of said draft members being pivotally connected to the upper portions of said blade and others of said draft members being similarly connected to the lower portions of the blade, and means by which said draft members may be lengthened or shortened independently of one another to relatively tilt said blade.

3. In an apparatus of the class described, a wheeled frame, a plurality of draft members pivotally connected to the forward end of said frame and extending rearwardly therefrom, a ground engaging blade, certain of said draft members being pivotally connected to the upper portions of said blade and others of said draft members being similarly connected to the lower portions of the blade, each draft member comprising a plurality of sections slidably secured together whereby said draft members may be lengthened or shortened independently of one another to relatively tilt said blade, and whereby the blade may be angularly adjusted with respect to the longitudinal center line of the apparatus, and means for independently adjusting the ends of said blade in a vertical plane to tilt it.

4. In an apparatus of the class described, a wheeled frame, draft members pivotally connected to the forward end of said frame and extending rearwardly therefrom, a ground engaging blade having its upper and lower portions pivotally connected to the rear ends of said draft members, means by which said draft members may be lengthened or shortened to relatively tilt said blade, adjusting rods universally supported upon said frame and having pivotal connections with the blade, and means by which said rods may be rotated to vertically adjust the blade.

5. In an apparatus of the class described, a wheeled frame, draft members pivotally connected to the forward end of said frame and extending rearwardly therefrom, suitable supports having their upper and lower portions pivotally connected to the rear ends of said draft members, a ground-engaging blade secured to said supports, means by which said draft members may be longitudinally adjusted, independently of one another to relatively tilt the blade, adjusting rods having universal connections with said frame, pivotal connections between said rods and said supports, and means for relatively rotating said rods to vertically adjust said blades.

6. In an apparatus of the class described, a wheeled frame, draft members pivotally connected to the forward end of said frame and extending rearwardly therefrom, suitable upright supports pivotally connected to the rear ends of said draft members, a ground-engaging blade secured to said supports, means by which said draft members may be longitudinally adjusted independently of one another to angularly adjust the blade both vertically and horizontally, adjusting rods having ball-and-socket connections with said frame and having threaded connections with the upper portions of said supports, and means for relatively rotating said rods to vertically adjust said blade.

7. In an apparatus of the class described, a wheeled frame provided with a forward extension, a draft tongue pivotally connected to said forward extension, means by which said tongue may be relatively laterally swung to guide the traveling movement of the apparatus, draft members having their forward ends pivotally connected to said frame and adapted for vertical swinging movement thereon, suitable supporting members pivotally connected to the rear ends of said draft members, a blade secured to said supporting members, each of said draft members comprising sections slidably and adjustably secured together, whereby the overall lengths of said draft members may be varied to relatively adjust the position of the blade, adjusting members having ball-and-socket connections with the rear portions of said frame, guides pivotally connected with said blade supporting members, and means movably connecting said adjusting members with said guides, whereby when said adjusting members are rotated, said supporting members will be vertically adjusted to change the position of the blade with respect to the ground.

8. In an apparatus of the class described, a wheeled frame provided with a forward extension, a draft tongue pivotally connected to said forward extension and adapted to swing about a vertical axis, means by which said tongue may be laterally swung to guide the traveling movement of the apparatus, draft members having their forward ends pivotally connected to said frame and adapted for vertical swinging movement thereon, suitable supporting members pivotally connected to the rear ends of said draft members, a blade secured to said supporting members, means by which said draft members may be longitudinally adjusted to vary the lengths thereof, and to relatively adjust the position of the blade, threaded rods having ball-and-socket connections with the rear portions of said frame, and threaded guides pivotally connected to said blade supporting members and received in threaded engagement with said rods, whereby when the rods are rotated, said supporting members may be vertically adjusted to change the position of the blade with respect to the ground.

9. In an apparatus of the class described, a wheeled frame provided with a forward extension, a draft tongue pivotally connected to said forward extension, means by which said tongue may be relatively laterally swung to guide the traveling movement of the apparatus, draft members having their forward ends pivotally connected to said frame and adapted for swinging movement, suitable supporting members pivotally connected to the rear ends of said draft members, a blade secured to said supporting members, each of said draft members comprising sections slidably and adjustably secured together, whereby the overall lengths of said draft members may be varied to relatively angularly adjust the position of the blade, adjusting members having movable connections with the rear portions of said frame, guides pivotally connected with said blade supporting members, and means movably connecting said adjusting members with said guides, whereby when said adjusting members are rotated, said supporting members will be vertically adjusted to change the position of the blade with respect to the ground.

10. In an apparatus of the class described, a wheeled frame provided with a forward extension, a draft tongue pivotally connected to said forward extension and adapted to swing about a vertical axis, means by which said tongue may be laterally swung to guide the traveling movement of the apparatus, draft members having their forward ends pivotally connected to said frame and adapted for swinging movement thereon, suitable supporting members pivotally connected to the rear ends of said draft members, a blade secured to said supporting members, means by which said draft members may be longitudinally adjusted to vary the lengths thereof, and to relatively angularly adjust the position of the blade, threaded rods having universal connections with the rear portions of said frame, and threaded guides pivotally connected to said blade supporting members and received in threaded engagement with said rods, whereby when the rods are rotated, said supporting members may be vertically adjusted to change the position of the blade with respect to the ground.

11. In an apparatus of the class described, a frame, means at one end of said frame whereby it may be connected to a tractor, a ground-engaging blade disposed transversely of the frame, draft members connecting said blade to said frame, and means whereby said draft members may be operated independently of one another to relatively tilt said blade in either a forward or a rearward direction.

EDWARD R. GREER.